(12) United States Patent
Rollet (10) Patent No.: US 11,271,952 B2
(45) Date of Patent: Mar. 8, 2022

(54) NETWORK PROBE AND METHOD OF PROCESSING MESSAGE

(71) Applicant: MITSUBISHI ELECTRIC CORPORATION, Tokyo (JP)

(72) Inventor: Romain Rollet, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/970,308

(22) PCT Filed: Jan. 31, 2019

(86) PCT No.: PCT/JP2019/004319
§ 371 (c)(1),
(2) Date: Aug. 14, 2020

(87) PCT Pub. No.: WO2019/181258
PCT Pub. Date: Sep. 26, 2019

(65) Prior Publication Data
US 2020/0412749 A1    Dec. 31, 2020

(30) Foreign Application Priority Data
Mar. 22, 2018   (EP) .................................. 18305324

(51) Int. Cl.
*H04L 29/06* (2006.01)
*H04L 9/32* (2006.01)
(Continued)

(52) U.S. Cl.
CPC ........ *H04L 63/1416* (2013.01); *H04L 9/3247* (2013.01); *H04L 12/2818* (2013.01); *H04L 67/12* (2013.01)

(58) Field of Classification Search
CPC ............. H04L 63/1416; H04L 63/1408; H04L 63/166; H04L 9/3247; H04L 67/12; H04L 12/2818; H04L 43/12
See application file for complete search history.

(56) References Cited

U.S. PATENT DOCUMENTS 8,805,996 B1 * 8/2014 Gauvin .................. H04L 51/32
709/224
10,110,561 B2 * 10/2018 Batke .................. H04L 63/0263
(Continued)

FOREIGN PATENT DOCUMENTS

| EP | 1 420 317 A2 | 5/2004 |
| EP | 3 133 793 A1 | 2/2017 |
| JP | 2017-502625 A | 1/2017 |

OTHER PUBLICATIONS

International Search Report for PCT/JP2019/004319 (PCT/ISA/210) dated May 16, 2019.
(Continued)

*Primary Examiner* — Brian J. Gillis
*Assistant Examiner* — Jsing Forng Lin
(74) *Attorney, Agent, or Firm* — Birch, Stewart, Kolasch & Birch, LLP (57) ABSTRACT

The invention relates to a method of processing messages in a Factory Automation, FA, architecture comprising a FA network comprising at least one device, and an external network, said method being implemented by a network probe and comprising: intercepting (201) a message issued from the external network and intended for a device among the at least one device of the FA network; classifying (202) the message among a predefined set of categories based at least on the device for which the message is intended; deciding (203) to issue an alert based at least on the category in which the message is classified.

14 Claims, 3 Drawing Sheets

(51) Int. Cl.
*H04L 12/28* (2006.01)
*H04L 67/12* (2022.01)

(56) References Cited

U.S. PATENT DOCUMENTS

| | | | | |
|---|---|---|---|---|
| 2011/0072506 A1* | 3/2011 | Law | ................... | H04L 63/1416 |
| | | | | 726/11 |
| 2013/0031037 A1* | 1/2013 | Brandt | ................... | G06N 20/00 |
| | | | | 706/12 |
| 2013/0080903 A1* | 3/2013 | Barda | ................ | H04L 63/0236 |
| | | | | 715/736 |
| 2013/0086244 A1* | 4/2013 | Besold | .................... | H04L 67/12 |
| | | | | 709/223 |
| 2016/0248679 A1* | 8/2016 | Blocher | .................. | H04L 47/28 |
| 2016/0350531 A1* | 12/2016 | Harris | ................... | G06F 21/552 |
| 2017/0295141 A1* | 10/2017 | Thubert | .............. | H04L 63/0209 |

OTHER PUBLICATIONS

Written Opinion of the International Searching Authority for PCT/JP2019/004319 (PCT/ISA/237) dated May 16, 2019.
Korean Notification of Reason for Refusal for Korean Application No. 10-2020-7026801, dated Oct. 18, 2021, with an English translation.
Japanese Office Action dated Aug. 31, 2021 issued in counterpart Japanese Application No. 2020-552501 with an English Translation.

* cited by examiner

Read Request: Subheader | Request destination numbers (Network | Station | Module | Multidrop Station) | Data length | Reserve | Command | Sub-command | Head device Number | Device code | Number of device

Read Response: Subheader | Request destination numbers (Network | Station | Module | Multidrop Station) | Data length | End code | Data

Write Request: Subheader | Request destination numbers (Network | Station | Module | Multidrop Station) | Data length | Reserve | Command | Sub-command | Head device Number | Device code | Number of device | Data

Write Response: Subheader | Request destination numbers (Network | Station | Module | Multidrop Station) | Data length | End code

NETWORK PROBE AND METHOD OF PROCESSING MESSAGE

TECHNICAL FIELD

The present invention generally relates to attack detection methods, in particular in the context of factory automation.

BACKGROUND ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The Seamless Message Protocol, SLMP, is originally a serial communications protocol developed for use with Programmable Logic Controllers, PLCs, by the applicant. The description of its usage, format and functions are explained in the SLMP Reference Manual published by Mitsubishi Electric that is publicly available online.

This protocol is similar to the ModBUS protocol with similar usage, functions and deployment.

Those protocols enable communications among many industrial devices connected to the same network for management and control purposes.

For example, an industrial system can measure temperature and humidity and can communicate the results to a computer. SLMP as well as ModBUS can be transported over a plurality of underlying network layers such as EIA/TIA-232, EIA/TIA-485 or Ethernet+TCP/IP.

Those industrial management protocols are based on a simple request/response scheme with a maximum message size.

Protocol functions include reading values from discrete inputs/coils (bit-size entities) or registers (16-bit-word entities), writing values to coils and registers, performing diagnoses for the servers and managing running software. After the server receives and processes a request from a client, it sends the corresponding response back to the client. The response can be either a normal response or an error (an exception) response.

The client shall wait for the response before sending a new request.

The data model or description is a very simple set of serial tables, all of them with different features. It allows a simple bit access to different devices located within the PLC such as discrete input and coils (i.e. relay), or 16-bit word access to input and internal registers.

The addressing model used to access the different devices is also very simple and generally consists in a fixed range of addresses to access the different serial tables.

However, these protocols were not initially designed with cyber-security issues. Therefore, they lack security mechanisms to avoid the well-known information security threats. For instance, these protocols do not include a way of ciphering the traffic, checking the integrity of messages and authenticating client and server.

The new generation of industrial systems (Industry 4.0 concept) will require connecting more and more the Factory Automation, FA, networks to external Information Technology (IT) networks and cloud servers, enforcing the risk of cyber-attacks. Indeed, an attacker may try to penetrate the Control and Field-Bus levels of the FA network to obtain confidential information, make disruption in the factory process, make some data unavailable for operators, returns some fake information to operators, etc.

As originally introduced, the communication used for FA management and control relies on unsecured protocols that may be directly varied over TCP or UDP.

Therefore an attacker is likely to compromise:
Confidentiality since the traffic goes clear over the network;
Integrity because it is currently impossible to know if the original message has been changed throughout the communication links; and/or
Availability due to the possibility for the attacker to use crafted packets or to reuse legitimated packets to consume either network resources, client resources or server resources (for example resetting TCP connections, performing flooding attacks, etc).

A simple FA network architecture may comprise an IT-Ethernet-based network connected to a FA network (at the control level and field bus) via a Relay Station acting as an interface between the IT protocols (Ethernet, TCP/IP) and the FA network protocols.

Sometimes, a PLC device may directly integrate the Ethernet standard to directly communication with IT devices, without transiting through the Relay Station.

In such architecture, an attacker may compromise one station of the FA network that is connected to the IT network, and may try to send malicious commands to some PLC located in the FA network, making damages on a robot connected to the fieldbus and controlled by the attacked PLC.

As explained above, application protocols such as SLMP and ModBUS used for management and control of FA networks do not include any security mechanisms.

Because of the evolution of the FA network topologies, they are now intensively used over standard communication layers such as TCP, or UDP and Ethernet, and are more and more used over IT communication network inter-connected to FA network.

Some attackers are able to compromise FA networks, which results in some potential major disruption in the FA installation and in the production lines.

There is therefore a need for an efficient attack detection method that is able to detect malicious messages emitted by some compromised IT devices towards the FA network over the (Ethernet) IT network.

Some methods according to the prior art were developed to detect potential intrusion tentative within the FA network.

Some of them consist in using a model-based approach for detecting intrusions. The basic idea is to construct models that characterize the expected/acceptable behaviour of the different communicating entities of FA network architecture. This approach detects attacks that cause the system to behave outside of the constructed models, and is applicable for attacks on the FA management protocols, on the Operating System OS platforms and on the networking infrastructure.

Unlike a signature-based approach, an advantage of the model-based approach is the possibility to detect unknown attacks. It is particularly well adapted to FA networks since there are few examples of attacks that are publicly known.

Anomalous activity such as flooding based Denial-of-Service, DoS, attack, is generally accompanied by a change in the statistical properties of the parameters indicating the anomaly (for example, the rate of received requests).

Hence, the problem of detecting such anomalous activities can be considered as a change detection problem with the aim to detect changes in the observed parameters with minimal delay and minimal false detection rate.

Different methods have been proposed and are often used to detect sharp changes: moving average, cumulative sum, spectral analysis, etc.

Signature detection methods are used to detect known attacks but they require knowing instances of attacks in advance and their corresponding traffic traces or features. These methods can detect byte sequences that aim to exploit vulnerabilities in running software. They are widely used by antivirus software deployed in IT systems.

As an alternative, they can also be used to efficiently detect legitimate traffic. When applied to industrial management protocols, the signature detection methods may be able to detect read or write request access to some particular resources, and to trigger alarms when they are issued from an unusual or non-trusty station.

However, an efficient and applicable detection method cannot rely only on signature attack detection methods since very few examples of FA attacks are known, and network traffic traces and features are not available.

In addition, attacks are designed for some specific FA deployments and particular network architectures: considering the diversity of FA applications and network topologies, building a relevant signature database is a very hard task and is quite difficult to maintain up-to-date.

Thus, there are needs for implementing a security policy that overcomes at least some of the above mentioned shortcomings.

SUMMARY OF INVENTION

To address at least some of these needs, a first aspect of the invention concerns a method of processing messages in a Factory Automation, FA, architecture comprising a FA network comprising at least one device, and an external network, the method being implemented by a network probe and comprising:
  intercepting a message issued from the external network and intended for a device among the at least one device of the FA network;
  classifying the message among a predefined set of categories based at least on the device for which the message is intended;
  deciding to issue an alert based at least on the category in which the message is classified.

Therefore, a security policy may be defined without the need to modify the FA network, only by monitoring the messages (commands) that are issued from the external network and intended for a FA network device. Indeed, the FA devices are difficult to update because of hardware constraint and the production environment. They cannot be replaced easily by new models with better performance. Such method also enables to detect multiple types of attacks, as it is not signature-based.

A message may designate any FA management message, such as a command of any type.

According to some embodiments, the network probe stores a classification table mapping at least categories of the predefined set with identifiers of the FA network devices.

Therefore, a given security policy may be defined in advance, or continuously updated, and implemented by means of the classification table, which enables the network probe to take quick decisions to classify the messages.

In complement, the identifiers of the devices may identify:
  the FA network;
  a device of the FA network;
  a module of the device, said module being dedicated to a given function of the device; and/or
  a resource within the module.

Therefore, different levels of granularity may be used when defining the security policy.

According to some embodiments, the message can be classified based on a type of the message also.

This enables to have a better accuracy in the security policy.

In complement, the classification table may map categories of the predefined set with identifiers of the devices of the FA network and with message types.

This enables the network probe to take quick decisions when classifying the message and issuing an alert.

Also in complement, the message can be according to the SLMP protocol and a type of the message can be one among:
  read access;
  write access;
  remote control;
  management; and
  device lock.

Therefore, the method can be used in the context of an SLMP FA network. However, the same principles may be used for a ModBUS FA network.

According to some embodiments, the method may further comprise parsing the message to determine whether the message comprises a signature, and if the message comprises a signature, verifying said signature, the message may be further classified based on whether the message comprises a signature and based on the verification of the signature.

Using signatures enables to safely classify a message in the safest category.

In complement, the message can be transported over TCP and the signature may depend on an initial TCP sequence number of a TCP connection corresponding to the message.

Using an initial TCP sequence number, such as the TCP sequence number comprised in a TCP SYN-ACK message, which is unique and randomly generated for each new TCP connection, enables to avoid replay attacks from attackers.

Still in complement, if the signature of the message is positively verified, then the message can be classified in the safest category, else the message can be classified based on at least device for which the message is intended.

This enables to more efficiently classify the messages.

According to some embodiments, m categories can be predefined and being numbered from 0 to m−1, 0 being the safest category, at least one limit value $n_i$ being prefixed, i being comprised between 0 and m−1, and the alert can be issued if the number of messages classified in a category equal to or higher than i is equal or greater than $n_i$.

This enables to flexibly define a security policy for the FA network.

According to some embodiments, the message can be issued by an application of the external network, the application can be authenticated with the network probe and, upon reception of a message from the application, the message being destined to a resource of a module of a device, a category mapped to the resource, to the module or to the device in the classification table can be set to a predefined category (that is safer than the initial category).

This enables to automatically fill at least one portion of the classification table. Then, the predefined category is used to classify subsequent messages that are intended for the same resource/module or device. According to some embodiments, the predefined category may depend on a type of the message received from the application.

Then, the predefined categories are differentiated per message type. For example, the predefined category for a write message is greater (so corresponds to a higher danger level) than the predefined category for a read message (which is less critical).

In complement, the category is modified from a first value to a second value corresponding to the predefined category, and, after expiration of a timer, is set again to the first value.

This enables to issue alert for resources that are no longer requested by trusted applications.

Another aspect of the invention concerns a computer program product comprising a computer readable medium having stored thereon computer program instructions loadable into a computing device and adapted to—when loaded into and executed by said computing device—cause the computing device to perform the steps of a method according to the first aspect of the invention.

A third aspect of the invention concerns a network probe for processing messages in a Factory Automation, FA, architecture comprising a FA network comprising at least one device, and an external network, the network probe comprising:
- a network interface for intercepting a message issued from the external network and intended for a device among the at least one device of the FA network;
- a processor configured for:
  classifying the message among a predefined set of categories based at least on the device for which the message is intended;
  deciding to issue an alert based at least on the category in which the message is classified.

A fourth aspect of the invention concerns a system comprising a network probe according to the third aspect and a Factory Automation, FA, network.

The present invention is illustrated by way of example, and not by way of limitation, in the figures of the accompanying drawings, in which like reference numerals refer to similar elements.

DESCRIPTION OF EMBODIMENTS

Figure 1:
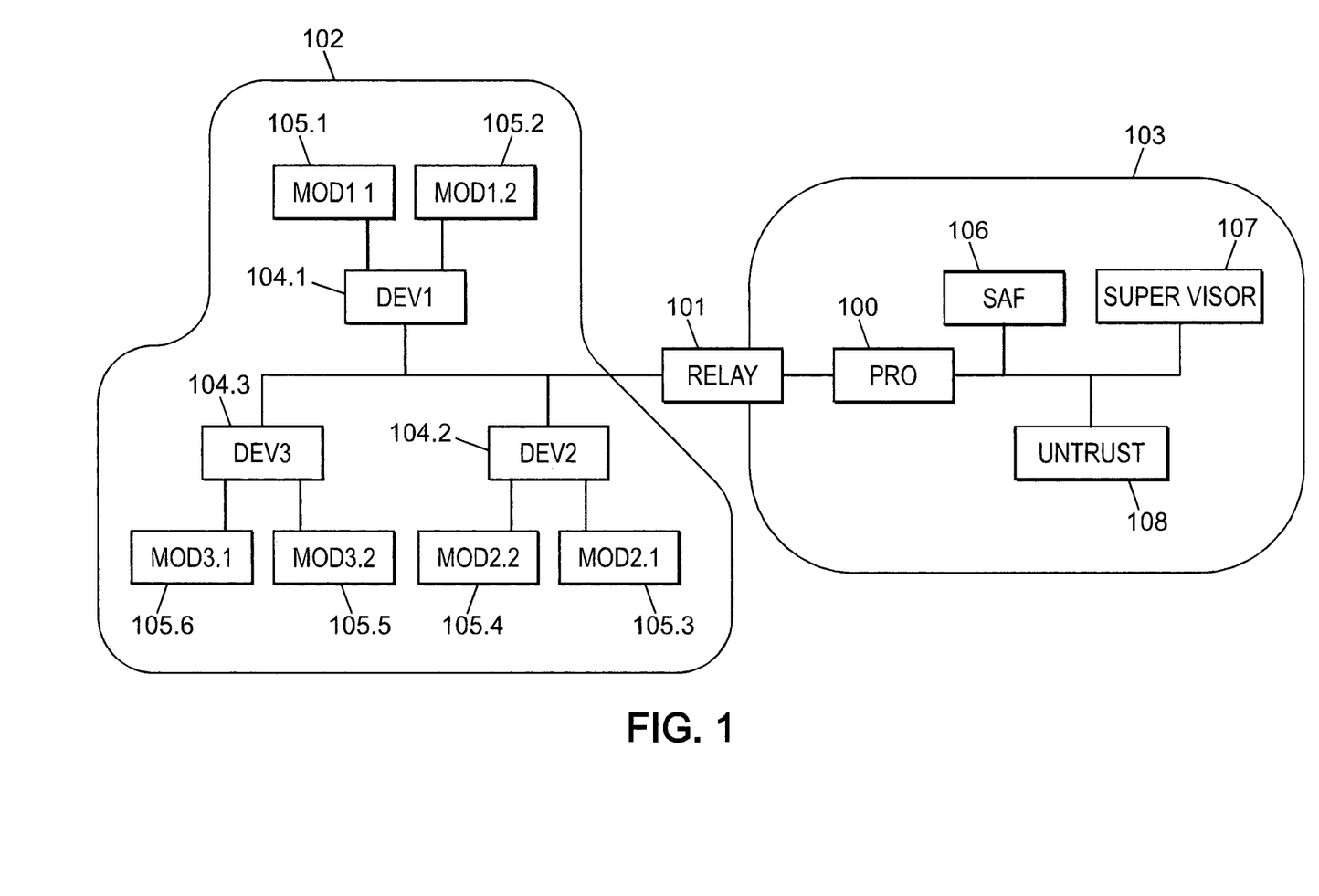
FIG. 1 represents a system FA network architecture according to some embodiments of the invention.

FIG. 1 illustrates a Factory Automation, FA, architecture comprising a FA network 102 comprising at least one device, and an external network 103 according to an embodiment of the invention.

On FIG. 1, the FA network 102 comprises three devices 104.1, 104.2 and 104.3, which are for example Programmable Logic Controllers, PLCs.

Each device can be associated with one or several modules, each module being dedicated to a given function. For example, a first module of a given device can be dedicated to controlling a first machine whereas a second module of the given device can be dedicated to controlling a second machine or a sensor.

On the example illustrated on FIG. 1, each of the devices comprises two modules. However, it can be understood that a device can comprise one or several modules and that the devices may not have the same number of modules.

The first device 104.1 comprises a first module 105.1 and a second module 105.2, the second device 104.2 comprises a third module 105.3 and a fourth module 105.4 and the third device 104.3 comprises a fifth module 105.5 and a sixth module 105.6.

The architecture also comprises a relay station 101 that can act as an interface between the external network 103 and the FA network 102. Indeed, in the FA network, a FA management protocol such as SLMP or ModBUS can be used to control the devices 104. In what follows, the example of SLMP is considered, for illustrative purpose only.

The external network may be an IT network such as an Ethernet network. In that case, the relay station 101 may be an Ethernet adapter configured for extracting SLMP messages contained in TCP or UDP frames carried over Ethernet. As explained before, SLMP and ModBUS can be transported over a plurality of underlying layers such as EIA/TIA-232, EIA/TIA-485 or Ethernet+TCP/IP (or UDP).

In what follows, the specific example of Ethernet+TCP or UDP is considered for illustrative purpose only.

A network probe 100 according to the invention can be located between the external network and the FA network, or any location where the network probe 100 can intercept any Ethernet frame issued from applications of the external network 103 and intended for one of the devices 104.

For example, the network probe 100 can be inserted in a firewall.

As explained hereafter, the network probe 100 is configured to monitor and inspect any Ethernet frame, and in particular, to analyse the FA management protocol (SLMP for example) request and response messages transported over TCP or UDP network layers. Also, the messages can be classified according to several criteria including at least the type of message and the destination of the message. The classification may also take into account the access frequency, the type of accessed resources and the source of the message. As explained hereafter, the network probe 100 is also configured to check a signature inserted in the FA management message, so that the running client application in the external network 103 can be fully trusted by the network probe 100.

The client applications may correspond to different entities on the external network 103, some of them being shown on FIG. 1 for illustrative purpose. For example, the client application can correspond to a trusted safety controller 106, to a trusted supervisor controller 107 or to an untrusted station 108.

"Trusted" means that the application is known or authenticated by the network probe 100. For example, it means that a signature of a message sent by the application has been previously verified and considered as valid by the network probe 100.

Figure 2:
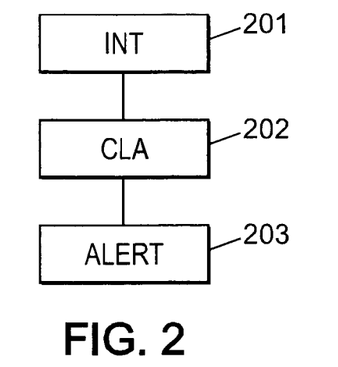
FIG. 2 is a diagram illustrating the steps of a method according to some embodiments of the invention.

FIG. 2 is a flowchart illustrating the steps of a method according to some embodiments of the invention. The method is implemented by the network probe 100.

At step 201, the network probe 100 intercepts a message issued from one application of the external network 103 and intended for one of the devices 104 of the FA network 102.

At step 202, the network probe 100 classifies the message among a predefined set of categories at least based on the device (an identifier of the device) for which the message is intended. Different security policies can be defined and applied to determine classification rules. According to a first embodiment, accesses to devices that are considered as critical, by non-authenticated applications are classified in the most dangerous category, while access by authenticated applications can be classified at the most confident or safest category.

According to another embodiment, when the network probe 100 is coupled with a firewall to block untrusted traffic intended for a critical device. For example, it may allow access (not issue an alert to the firewall) to critical devices only for the trusted applications. Even if an entity of the external network 103 running an application is infected, it will not be possible for the attacker to forge some FA management messages to access critical devices because it cannot sign its malicious messages (as the attacker does not have the credential to do so). For example, untrusted applications can only access to non-critical devices, but accesses to critical devices are blocked by the firewall.

A critical device may be considered as a device for which one of the functions is considered as critical. For example, the function of a fire sensor can be considered as critical in terms of security for a given factory, whereas a function of a temperature or humidity sensor may be considered as non-critical.

Therefore, according to these two embodiments, the criteria that are taken into account for classifying a message are the device for which the message is intended and the application from which the message is issued (trusted or not).

Other embodiments of step 202, using other combination of criteria, will be described in what follows.

At step 203, the network probe 100 decides to issue an alert based at least on the category in which the message is classified. The alert can be transmitted to a firewall to block the message. Alternatively, the alert can be transmitted to the trusted safety controller 106. According to some embodiments, and as further detailed hereafter, the categories of several classified messages can be taken into account when determining whether an alert is to be issued.

In what follows, it is proposed to introduce signatures to authenticate FA management messages. Signatures can then be parsed and taken into account by the network probe 100 to classify a message. As already explained, the example of SLMP protocol is considered for illustrative purposes only.

SLMP has not been designed with security in mind. Some embodiments of the invention propose to introduce a signature that authenticates SLMP messages, without changing the SLMP packet format. Indeed, every compatible SLMP device and application should continue to be able to decode any SLMP message.

According to the invention, an SLMP message, when transported over the TCP protocol, can be signed with a Connection Signature Key, CSK, that is different for each SLMP client application (for each of the entities 106 to 108 shown on FIG. 1 for example), and known by the network probe 100.

The CSK can be calculated from an Encryption Root, ER, value that is known by every trusted application and the network probe 100. This value can for example be shared via a secure channel.

In the case where SLMP is transported over TCP, for a TCP connection i, the CSK can be determined as follows:
$CSK_i = df(ER, IV_i)$, where df is a diversity function and $IV_i$ is an initialization vector used for the connection i. For example, the TCP sequence number returned by the entity acting as the SLMP server (one of the devices 104) in a TCP SYN-ACK packet may be used as $IV_i$. Indeed, this value is advantageously randomly generated for each new TCP connection.

$$IV_i = SN_{SYNACK,i} \| LSB(IP_{src}) \| LSB(IP_{dst})$$

where $SN_{SYNACK,i}$ is the returned TCP sequence number for connection i, $IP_{src}$ is the IP address of the source, $IP_{dst}$ is the IP address of the destination and LSB designates the Least Significant Bit.

The CSK is then used to sign the SLMP message transported as TCP payload. Signing can be performed by a Keyed-Hash message Authentication Code (HMAC) preferably with a SHA256 algorithm. The resulting Message Authentication Code, MAC, can be defined as
MAC=HMAC(CSKi, M), where CSKi is the CSK for TCP connection i and M the concatenation of the SLMP message and a 32-bits message counter.
M=MsgCounter∥SLMP data
"∥" designates a concatenation operation.

As there is originally no message counter in the SLMP message format, the 32-bit message counter is to be maintained intrinsically in both emitter and receiver.

This message counter enables to differentiate between two similar SLMP requests, which prevent an attacker to perform replay attacks (sending several times the same allowed message).

The example of a 32-bits message counter is given for illustrative purposes. However, this embodiment can be extended to any message counter.

According to some embodiments, the SLMP Message Authentication Code, MAC, or signature, may be based on the whole SLMP message including header (subheader, request destination network, etc) and request/response data. Prior to computing the SLMP signature, the reserved fields can be set to 0.

The SLMP signature inserted in an SLMP message intended to one of the devices 104 can then be checked by the network probe 100 when classifying the message. For example, the SLMP signature can be inserted in a field of the SLMP message that is not used for other purposes.

Figure 3:
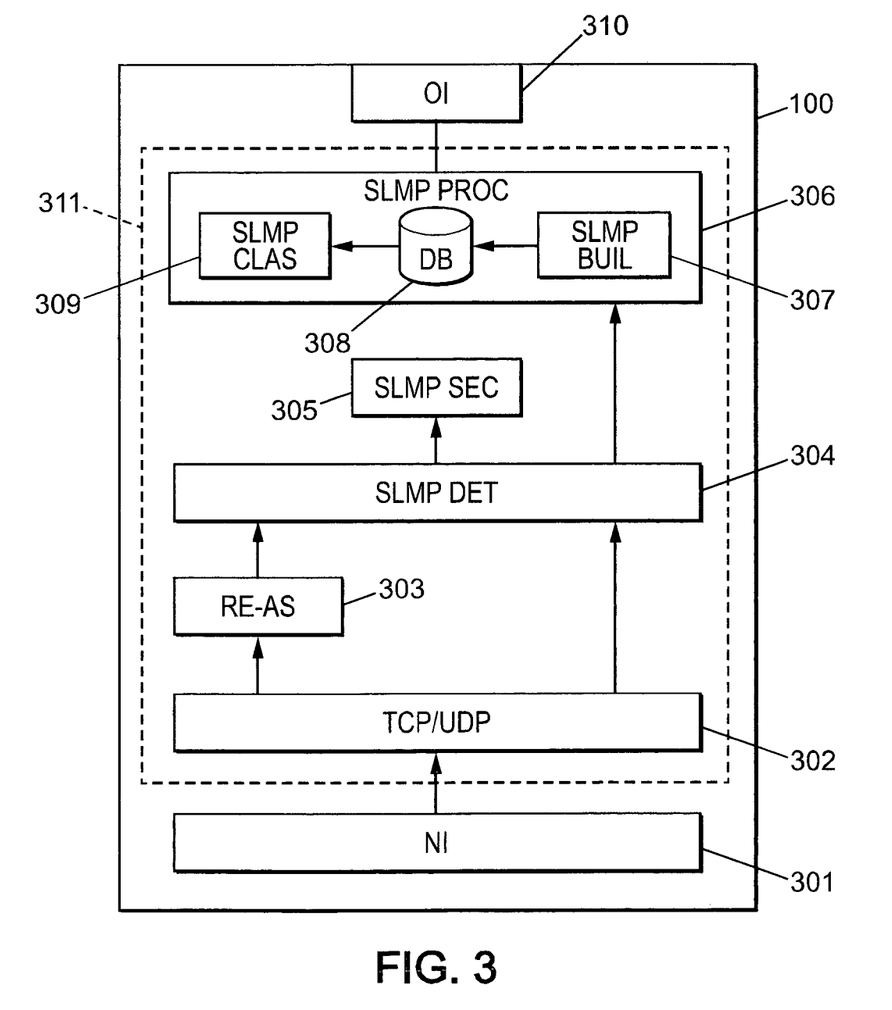
FIG. 3 shows the structure of a network probe according to some embodiments of the invention.

FIG. 3 shows a detailed structure of a network probe 100 according to some embodiments.

The network probe 100 comprises a network interface 301, such as an Ethernet interface for example, to receive Ethernet frames from the external network 103.

The Ethernet frames can then be processed by a processor 311 comprising a TCP connection/UDP session manager 302. The manager 302 is configured for monitoring TCP connections and UDP data streams. Such monitoring may consist in maintaining a specific information context identified by a quadruplet [source IP address; source TCP/UDP port; destination IP address; destination TCP/UDP port]. This context is used to store information related to the TCP connection/UDP data stream and to update it.

For TCP, a new context is opened upon reception of a SYN/SYN-ACK/ACK TCP packet sequence.

According to some embodiments, the network probe 100 may filter the incoming packet, without extracting any SLMP message, in order not to analyse all the Ethernet traffic. For instance, some filters can be defined to only analyse traffic with destination TCP/UDP ports included in a given range. According to some other embodiments, a pattern matching algorithm can be applied to detect some predetermined FA management protocols. If these protocols are not detected, the Ethernet traffic is merely forwarded to the destination.

In case of an Ethernet frame carrying a TCP segment, the TCP data is extracted and may be re-assembled in a TCP reassembly buffer 303 in order to get a continuous data stream to be passed to the SLMP detector 304.

In case of an UDP segment, it is directly forwarded to the SLMP detector.

The SLMP detector 304 is configured to check whether the TCP connection or UDP packet conveys correct SLMP data. To achieve this, the sub-header SLMP value of the SLMP message (request or response) is checked, to check whether it contains a specific value according to the SLMP specifications, in binary of ASCII code. The SLMP detector 304 may also be configured to check whether the claimed data length is respected (whether the actual data length corresponds to the data length indicated in a Data Length field). As a complement, the SLMP detector 304 may be configured to check whether the message data length is consistent with the type of message.

According to SLMP, there are five different types of messages:
 read access to different resources of a device (register, I/O, relay, timer, counter, etc);
 write access to different resources of a device;
 remote control, in particular for remotely stopping the device;
 management (self-test; clear error, read type names; global signal);
 device lock, which is used to secure a device by defining a password.

If the message does not convey correct SLMP data, the message can be cancelled and/or not forwarded to the destination device.

If the SLMP message is correct, and if it is signed, it is forwarded to the SLMP security unit 305. If the SLMP message is correct and if it is not signed, it is directly forwarded to the SLMP message processor 306. Whether or not the SLMP message is signed can be checked by detecting a field indicating whether the message contains a signature or not. For example, the first Most Significant Bit, MSB, of a reserved 16-bits field indicates whether signature is introduced. For example, if it is set to 1, it indicates that the SLMP message is signed.

In addition, only the SLMP message carried over TCP (and signed) can be transmitted to the SLMP security unit 305, the ones being carried over UDP being forwarded directly to the SLMP message processor 306.

The SLMP security unit 305 is configured to check the signature that is comprised in the SLMP message. To achieve this, it is checked whether the MAC value corresponds to the value calculated above (for example based on the TCP sequence number).

If the signature is correct, the SLMP security unit 305 is configured to mark the TCP connection as trusted. Therefore, when checking further SLMP messages belonging to a trusted TCP connection, if one of these SLMP messages contains no signature or an incorrect signature, it can be classified in the most dangerous category by the SLMP message processor 306.

Finally, the SLMP message processor 306 processes the SLMP message. A SLMP classification builder 307 extracts relevant information from the SLMP message (for example one or any combination of the following information: signed or not, destination, source, message type, etc).

The extracted information is then used by the SLMP classifier unit 309 with a classification table stored in a database 308 to classify the SLMP message in a category among a predefined set of categories.

For example, the set of categories can comprise at least two categories (legitimate/safe and dangerous/critical). According to some preferred embodiments, the set of categories may comprise more than two categories. For example, the categories may be numbered from 0 (legitimate/safe) to 4 (critical/dangerous). According to the security policy, an alert can be issued at step 203 based on at least the category of the last classified SMTP message. The alert can be an alarm issued by an output interface 310 and for example transmitted to a firewall.

All the operations implemented by the processor 311 can be seen as sub-steps of the classification step 202 illustrated on FIG. 2.

According to a given security policy, an alert can be issued after the reception of $n_i$ SMTP messages with a classification level greater than i. For example, if the value $n_3=3$ is stored, and if an SLMP message of category 4 and two SLMP messages of category 3 have been received, an alert is issued. The $n_i$ value or values can be defined by an administrator and may depend on a trade-off between the number of issued alerts and the global security.

The fact that a connection is trusted or not can be used to update the classification table, as it will be explained hereafter.

As explained above, several criteria can be taken into account to classify the SLMP messages in one of the categories.

The message type can be taken into account. The message type is indicated in a command field of a SLMP message.

According to some embodiments, if the SLMP message is correctly signed, then the message can be considered as legitimate and a category 0 can be effected. Also, if the SLMP message is not signed, then the classification level may depend on the destination device, or more precisely on the destination module, and on the message type.

In addition, for device accesses such as read and write types, it may also depend on the type of accessed resources and their addresses as indicated in the SLMP frame format, as described in table 2 hereafter.

For each physical SLMP-addressable module 105.1-105.6, Table 1 gives an example of how the categories can be allocated to a non-signed SLMP message by the SLMP message classifier 309.

TABLE 1

Classification table indicating categories for non-device accesses message types

|  | Device Lock | Remote Control | Management |
|---|---|---|---|
| Net #0/Device 104.1/ Module 105.1 | 4 | 1 | 2 |
| Net #0/Device 104.1/ Module 105.2 | 4 | 2 | 2 |
| Net #0/Device 104.2/ Module 105.3 | 4 | 4 | 4 |

In this example, Net #0 identifies the FA network 102. Indeed, the network probe 100 can be in charge of several FA networks, and, in that case, the destination FA network needs to be identified.

In Table 1, the categories are differentiated per module. According to some embodiments, the categories may be differentiated per device only.

For read and write message types, two dedicated classification tables may be defined, for each addressable device, or for each addressable module. In such classification tables, the categories can be differentiated according to the type of resources and according to the address range of the resource, for a given addressable module or device.

In this example, the module identified by a triplet (0, 1, 0) designates the module 105.3 (network 0 referenced by the first "0", device 104.2 referenced by "1"). It is to be noted that the values of the triplet may be coded using one or several bits depending on the number of networks and the number of devices and modules addressable in each network.

TABLE 2

Classification table for read access message types intended to module (0, 1, 0)

| Resource type | Address range | Classification level |
|---|---|---|
| Relay | [0-100] | 3 |
| Relay | [100-200] | 2 |
| Data register | [0-20] | 4 |

In the example described in Table 2, the relay resource type may designate a resource for controlling (turning off or on) a motor for example. A data register resource may store the motor speed.

Figure 4:
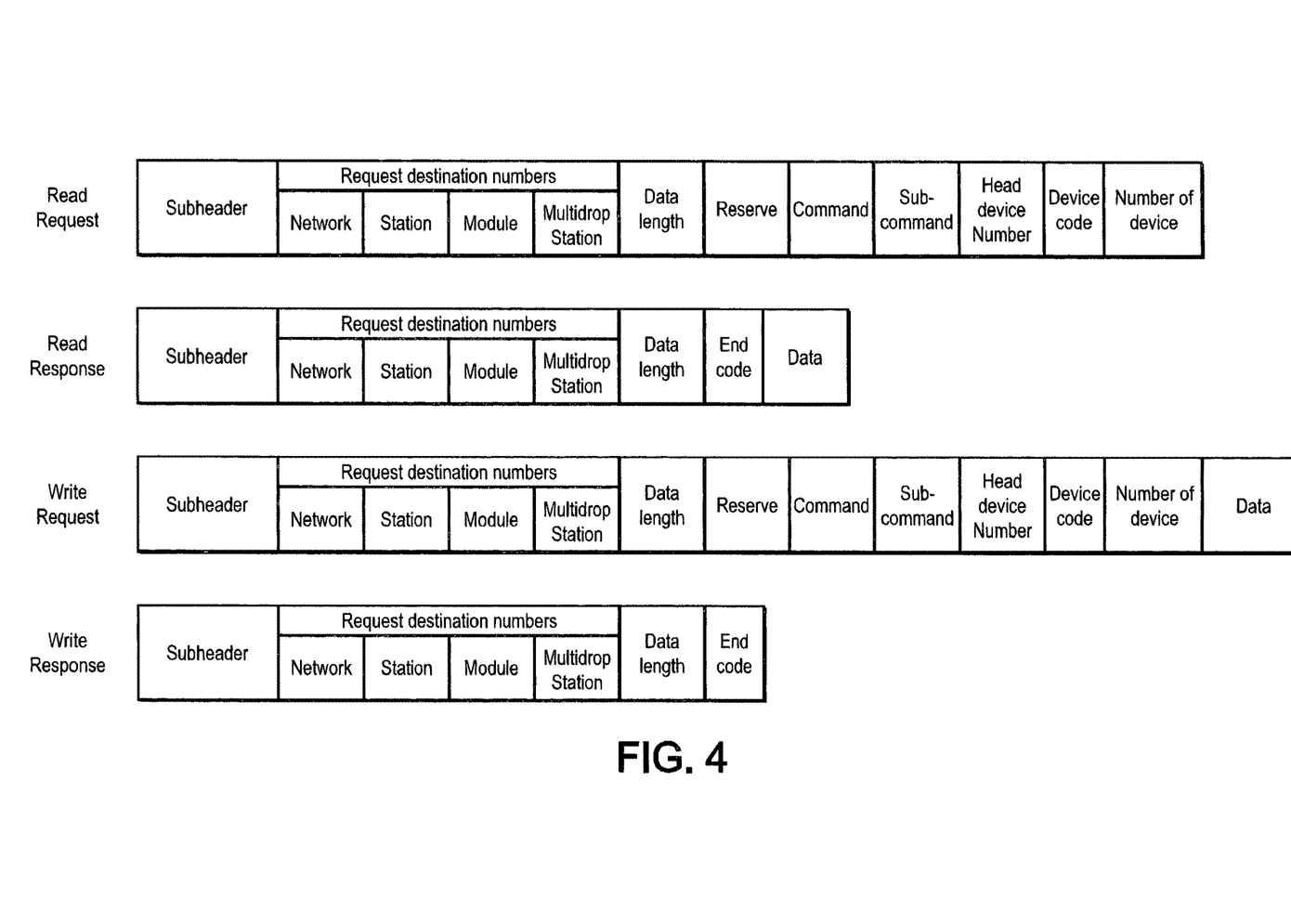
FIG. 4 shows the SLMP format for read/write messages.

Generally, the type of resource is indicated in the message thanks to some dedicated fields. For example, for SLMP, the structures of the protocol messages are shown on FIG. 4. FIG. 4 shows the SLMP format for read/write messages (request and response). In particular, they contain "Command" and "Sub-command" fields that identify the type of message.

As it can be observed, fields are dedicated to the destination network, station and module. Also, SLMP provides the possibility to build batch commands so as to read/write a set of consecutive bits or words.

The definition of the classification tables is a task that depends on the expected security level and on the features of the specific FA network. It is a long and tough task since every resource of every module or device may have to be declared and referenced in the classification tables by a network administrator.

Some embodiments of the invention enable to address these shortcomings by providing automatic learning methods that at least partially enable to fill the classification tables.

According to these embodiments, messages corresponding to trusted connections can be used to fill the classification tables, in particular the classification table corresponding to read/write message types.

This relies on the following assumption: it can be considered that if a legitimate application accesses a specific device, module or resource, then the same device/module/resource can be also accessed by other applications without any risk.

This rule can be moderated by predefining categories for read and write accesses that are set when trusted applications issue accesses to modules/resources. For example, we suppose that a predefined category for read access for a specific module is set to 1 and the predefined category for write access is set to 2. No restriction is attached to the categories that are predefined.

A default category for write/read access to a resource is applied, until a trusted application makes a read/write access to these resources.

For example if a legitimate application (an authenticated application for example) such as the trusted supervisor controller 107, issues a read access message destined to relays #10-13 of module 105.3, the network probe sets the category associated with read access type messages to these resources to a predefined category equal to 1. Subsequent read access type messages, even issued from non-trusted application, and intended for these resources, will then be classified in category 1.

However, a subsequent write access type message for these same resources, issued from a non-trusted application, will be classified in category 4 since no legitimate application has previously sent a write access type message for these resources. Category 4 can thus be considered as a default category for write/read access to a resource, until a trusted application makes a read/write access to these resources.

Using this, alerts can be issued when an untrusted application request access to some resources on critical modules.

The same rule can be generalized to modules or devices (not only resources). For example, if a legitimate application accesses to a given module, the classification table can be updated for the whole module.

In complementary embodiments, the network probe 100 may update the classification table based on messages of trusted application only for certain types of messages, such as read access type for example. In that case, the classification table for the write access type may be filled by an administrator.

More generally, some portions of the classification tables may be filled by an administrator whereas other portions may be filled based on analysis of messages issued from trusted applications.

According to some embodiments, each time an entry in the classification table is updated upon reception of a message from a trusted application, a timer may be armed. Upon expiration of the timer, the updated entry may be removed and replaced by the default value. The value of the timer can be predefined by an administrator.

This enables to issue alerts for messages intended for resources/modules/devices that are no longer accessed by trusted applications.

These learning steps enable to quickly adapt to the evolution of the FA network 102. For instance, if new modules are added in the FA network 102 and the applications of the external network 103 are updated, then the classification tables will be at least partially updated in an automatic way.

According to the invention, many attacks can be detected, in particular network and resource scanning attacks that are used by an attacker as a first step to discover and understand the different devices and modules of an unknown FA network.

The present invention can also be embedded in a computer program product, which comprises all the features enabling the implementation of the methods described herein, and which, when loaded in an information processing system, causes the information processing system. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A method of processing messages in a Factory Automation, FA, architecture comprising a FA network comprising at least one device, and an external network, said method being implemented by a network probe and comprising:
   intercepting a message issued by an application of the external network and destined to a device among the at least one device of the FA network;
   classifying the message among a predefined set of categories based at least on the device to which the message is destined and whether or not the application from which the message is issued is trusted;
   deciding to issue an alert based at least on the category in which the message is classified, wherein
   the application is trusted in a circumstance in which the application is known or authenticated by the network probe; and
   wherein the network probe stores a classification table mapping at least categories of the predefined set with identifiers of the devices of the FA network.

2. The method according to claim 1, wherein the message is classified further based on a type of the message.

3. The method according to claim 1, wherein the message is classified further based on a type of the message, and the classification table maps categories of the predefined set with identifiers of the devices of the FA network and with message types.

4. The method according to claim 2, wherein a type of the message is one among:
   read access;
   write access;
   remote control;
   management; and
   device lock.

5. The method according to claim 1, further comprising parsing the message to determine whether the message comprises a signature, and if the message comprises a signature, verifying said signature;
   wherein the message is further classified based on whether the message comprises a signature and based on the verification of the signature.

6. The method according to claim 5, wherein the message is transported over TCP and wherein the signature depends on an initial TCP sequence number of a TCP connection corresponding to the message.

7. The method according to claim 5, wherein if the signature of the message is positively verified, then the message is classified in the safest category,
   else the message is classified based on at least device for which the message is intended.

8. The method according to claim 1, wherein m categories are predefined and being numbered from 0 to m−1, 0 being the safest category, wherein at least one limit value $n_i$ being prefixed, i being comprised between 0 and m−1, and wherein the alert is issued if the number of messages classified in a category equal to or higher than i is equal or greater than $n_i$.

9. The method according to claim 1, wherein the application is authenticated with the network probe and wherein, upon reception of a message from said application, said message being destined to a resource of a module of a device, a category mapped to the resource, to the module or to the device in the classification table is set to a predefined category.

10. The method according to claim 9, wherein the predefined category depends on a type of the message received from the application.

11. The method according to claim 9, wherein the category is modified from a first value to a second value corresponding to the predefined category, and, after expiration of a tinier, is set again to the first value.

12. A computer program product comprising a computer readable medium having stored thereon computer program instructions loadable into a computing device and adapted to when loaded into and executed by said computing device cause the computing device to perform the steps of a method according to claim 1.

13. A network probe for processing messages in a Factory Automation, FA, architecture comprising a FA network comprising at least one device, and an external network, the network probe comprising:
   a network interface for intercepting a message issued by an application of the external network and intended for a device among the at least one device of the FA network;
   a processor configured for:
   classifying the message among a predefined set of categories based at least on the device for which the message is intended and whether or not the application from which the message is issued is trusted;
   deciding to issue an alert based at least on the category in which the message is classified,
   wherein the application is trusted in a circumstance in which the application is known or authenticated by the network probe; and
   wherein the network probe stores a classification table mapping at least categories of the predefined set with identifiers of the devices of the FA network.

14. A system comprising a network probe according to claim 13 and a Factory Automation, FA, network.

\* \* \* \* \*